May 20, 1924.                                                    1,495,109
R. S. REYNOLDS
REFRIGERATING CONTAINER
Original Filed Dec. 24, 1921    2 Sheets-Sheet 1

Inventor
Richard S. Reynolds
By Mason Fenwick Lawrence,
Attorneys

May 20, 1924.

R. S. REYNOLDS

REFRIGERATING CONTAINER

Original Filed Dec. 24, 1921   2 Sheets-Sheet 2

Inventor

Richard S. Reynolds

By Mason Fenwick & Lawrence,
Attorneys

Patented May 20, 1924.

1,495,109

UNITED STATES PATENT OFFICE.

RICHARD S. REYNOLDS, OF LOUISVILLE, KENTUCKY.

REFRIGERATING CONTAINER.

Application filed December 24, 1921, Serial No. 524,728. Renewed April 16, 1924.

*To all whom it may concern:*

Be it known that I, RICHARD S. REYNOLDS, a citizen of the United States, residing at Louisville, in the county of Jefferson and State of Kentucky, have invented certain new and useful Improvements in Refrigerating Containers; and I do hereby declare the following to be a full, clear, and exact description of the invention, such as will enable others skilled in the art to which it appertains to make and use the same.

This invention relates to containers adapted to store and preserve perishable materials. It relates more particularly to heat insulated containers intended to hold ice cream in bulk, or in bricks or blocks, in which the ice cream is maintained in a chilled or frozen state by a freezing mixture or refrigerant so disposed with respect to the ice cream as to effect transfer of heat most efficiently and so confined as to avoid all danger of contamination of the ice cream from the salt or other ingredients of the freezing mixture. The container is more particularly adapted for preserving relatively small quantities of the frozen product for delivery to homes or for sale in small establishments.

The invention consists in a double walled container adapted to insulate the interior from the external atmosphere, in combination with a cover therefor comprising a sealed receptacle for the freezing mixture or refrigerant as more particularly described hereinafter and defined in the appended claims.

In the accompanying drawings in which like reference characters indicate like parts throughout the several views, Figure 1 is a vertical section through the center of the improved container;

Figure 1:
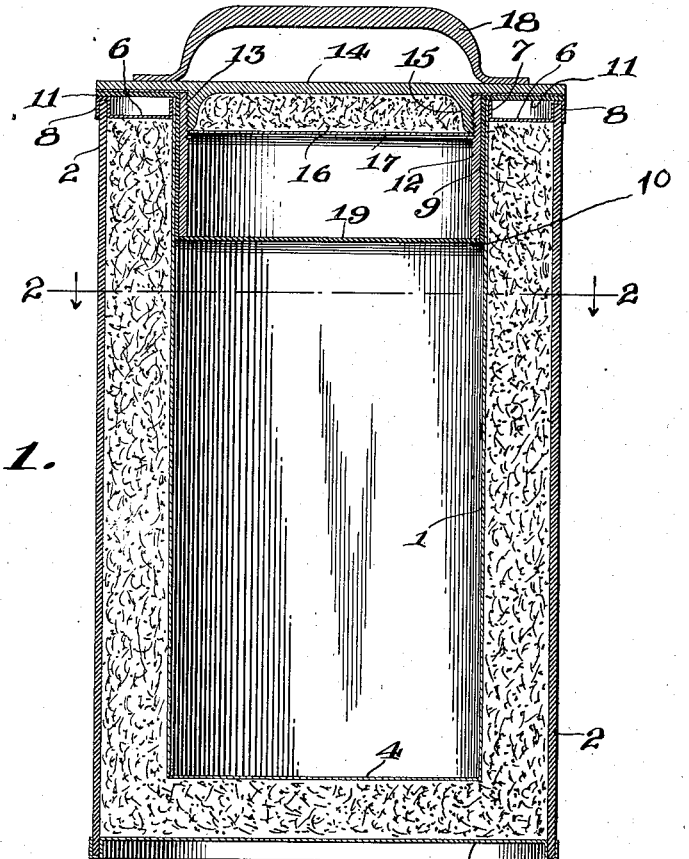
Figure 2:
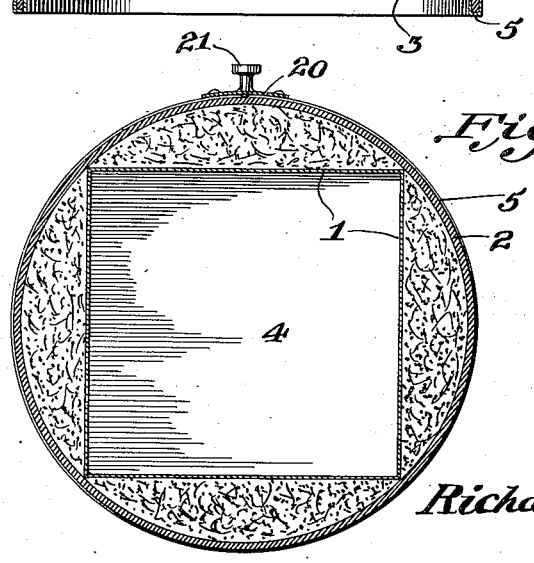
Figure 2 is a horizontal section therethrough on the line 2—2 of Figure 1.
Figure 3:
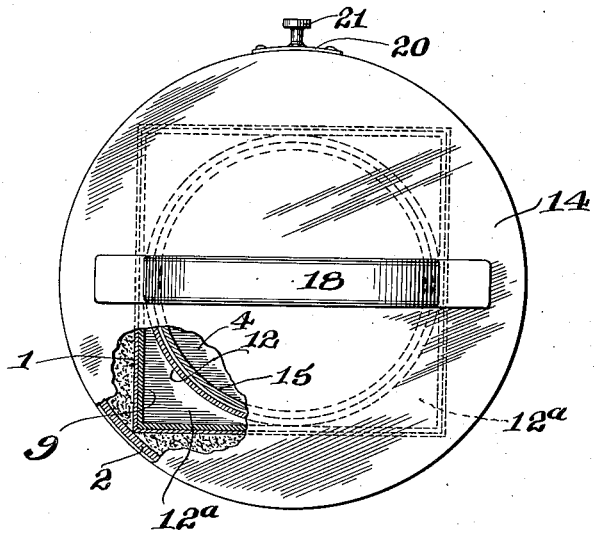
Figure 3 is a top plan view of the combined cover and receptacle for the chilling material broken away in part.

In the drawings, in which I have illustrated the preferred embodiment of my invention, 1 indicates the side walls of an inner receptacle, which may be rectangular in cross section, the rectangular form adapting it particularly for the reception of bricks, cakes or bars of ice cream, which may be wrapped in tin foil or other suitable wrapping material. Encompassing the inner receptacle is an outer container herein shown as having a cylindrical side wall 2 and disk-like bottom 3. The space between the bottom 3 of the outer container and the bottom 4 of the inner receptacle, and the space between the side wall 1 of the inner receptacle and the side wall 2 of the outer container may be filled with any suitable insulating material, such as ground cork; or the inner and outer walls may be so constructed as to serve in any known manner to prevent the transfer of heat between the outer and the inner wall. The inner and outer receptacle may be made of any material suitable for the purpose such as tinned sheet iron. I prefer to use as an outer container a paper walled vessel formed of spirally and helically wound and suitably treated sheets of paper stock such as is disclosed in my Patent 1,299,031, June 24, 1919. The bottom 3 may be pressed from suitable sheet material, preferably sheet metal, and inset, as shown, within the lower margin of the side wall of said outer container and may have a groove pressed in a marginal flange 5 to embrace the lower edge of the side wall 2 as shown, and the metal of the grooved flange 5 may be compressed upon said wall securely. To close the upper end of the insulated space between the walls of the inner receptacle and outer container a cover plate 6, of sheet metal, may be pressed in between said walls 1 and 2, as shown. The cover plate 6 may be provided with an inner rectangular flange 7, and an outer circular grooved flange 8, the latter being extended over the top margin of the wall 2 and turned down on the exterior, as illustrated in Figure 1; and the sheet metal may be compressed upon the edge of the wall 2.

In order to confine the contents of the inner receptacle substantially air tight, and to provide for maintaining a refrigerant or freezing mixture in position to chill the contents but prevent escape thereof into the receptacle 1, I have provided a combined cover and freezing mixture or other refrigerant container adapted to have a tight friction fit in the upper portion of the inner receptacle and to seal the freezing mixture so that it cannot escape. The said combined cover and container comprises a cup-shaped body 19 which may be made of suitable sheet material shaped so as to exactly fit within the upper end of the inner receptacle. This cover container comprises side walls 9, a bottom 10 and a lateral flange 11 extending at right angles from the upper edge of the side walls 9, said flange being of such form and dimensions as to completely cover the upper end of the entire container and extend over the upper edge of wall 2. As, in the embodiment illustrated, the inner receptacle is square in section, the body of said cup-shaped cover and freezing mixture container is of corresponding exterior form. In order to stiffen the said freezing mixture container and provide a round opening into which a cover may be screwed, a cylindrical lining 12 of relatively thick material is fitted into the chamber of said cover and freezing mixture container. The inner surface of said lining is screwthreaded, as shown at 13 and is suitably held to the walls 9 and bottom 10. The cylindrical lining 12 serves to hold the walls 9 rigidly so that they cannot bulge inward and to provide dead air spaces 12ª, serving as additional insulation at those points where the corners of the wall 1 of the inner receptacle contact with the wall 2 of the outer container, at which points the insulation is less complete than at other points.

The said combined cover and freezing mixture container is provided with a suitably insulated outer cover, here shown as consisting of a flat disk 14 of considerable rigidity having a cylindrical threaded flange 15 on its under side, adapted to engage the threaded lining 12, the space within the flange serving for the reception of any suitable insulating material 16, which may be confined by a plate 17. A cover handle 18 of adequate strength may be provided, by means of which the cover may be screwed into place. The joint between the cover 14 and the flange 11 of the freezing mixture receptacle may be made air tight in any suitable manner.

It will be apparent that the improved container is inexpensive to manufacture; that it is adapted to maintain ice cream or other frozen products in good condition without danger of contamination from the freezing mixture, for the reason that said mixture is substantially hermetically separated from the ice cream or other frozen products. The freezing mixture, being placed at the top of the receptacle, transfers its low temperature to the contents of the receptacle in the most efficient manner since the air, chilled by direct contact with the bottom of the freezing material chamber, sinks to the bottom of the receptacle displacing the warmer air which rises to be again chilled in its turn.

Having described my invention, what I claim and desire to secure by Letters Patent is:

1. A heat insulated container comprising an inner chamber inclosed within an outer container, a closure for said inner chamber comprising a cup-like refrigerant container adapted to fit snugly within the upper end of said inner chamber, said cup-like container having a flange adapted to overlie the top of the insulated container, a threaded lining in said cup-like container and a screw threaded insulated cover engaging the threaded surface of the threaded lining, said cover having a flange corresponding in area and contour with the flange of the cup-like container, and adapted to engage the outer surface thereof, the mouth of the cup-like container being equal in area to the cross section thereof.

2. A heat insulated container comprising a rectangular inner chamber enclosed within a cylindrical outer wall, a tight closure therefor comprising a flanged receptacle adapted to fit frictionally within the upper end of said inner chamber, a threaded cylindrical lining for said closure receptacle, and a heat insulated screw-threaded cap adapted to screw into said lining and seal said closure receptacle.

3. A heat insulated container comprising a rectangular inner receptacle enclosed within a cylindrical outer container, a rectangular, flanged refrigerant container adapted to fit tightly within the inner receptacle, said refrigerant container having a cylindrical threaded lining; and a heat insulated cover plate provided with a cylindrical threaded flange for engaging the threaded lining and a horizontal flange extending over the top of said outer container and engaging the flange of the refrigerant container.

In testimony whereof I affix my signature.

RICHARD S. REYNOLDS.